Sept. 7, 1937.  F. R. WEYMOUTH  2,092,662
RETRACTABLE LANDING GEAR
Filed Nov. 25, 1936  2 Sheets-Sheet 1
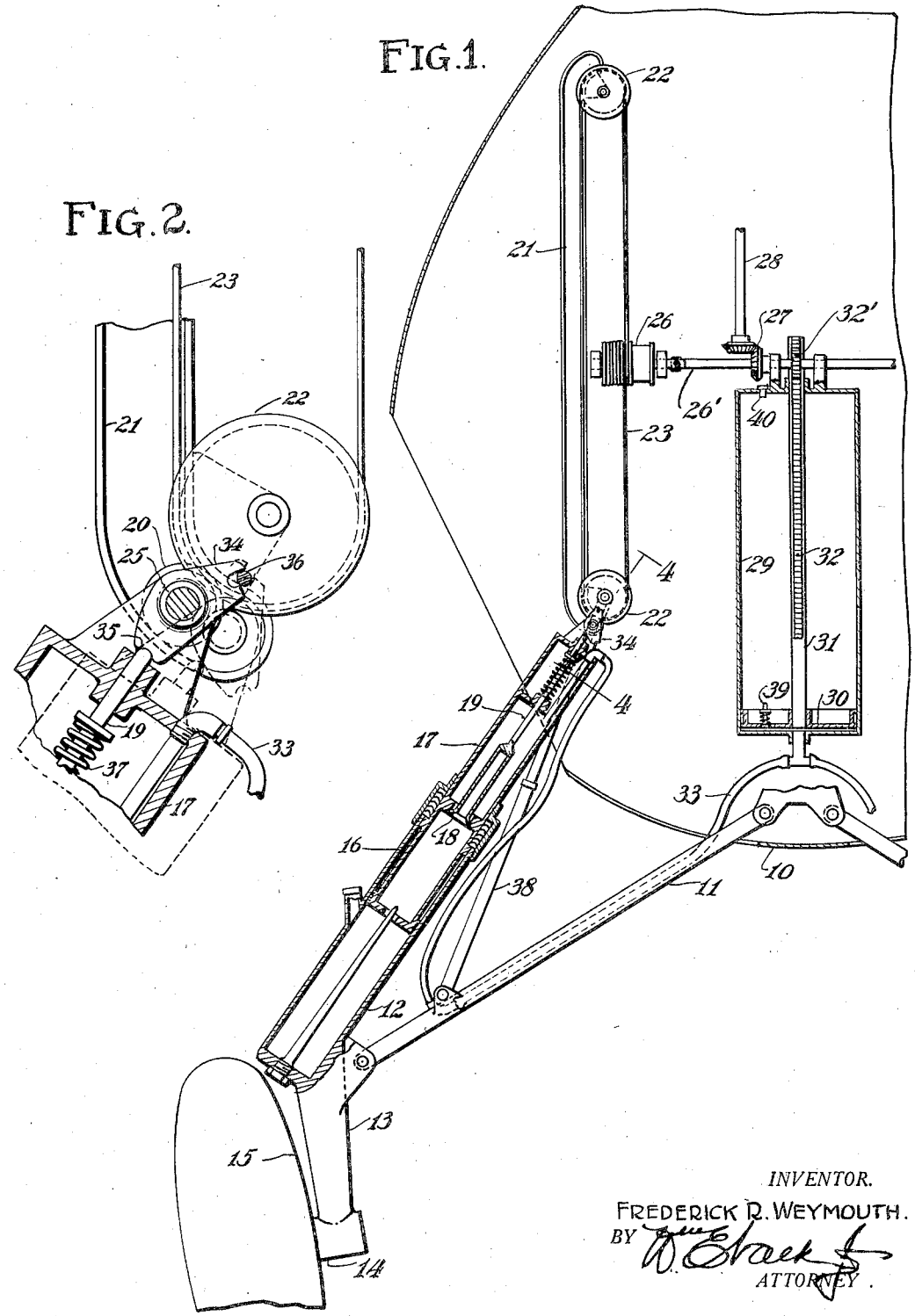
INVENTOR.
FREDERICK R. WEYMOUTH.
BY
ATTORNEY.

Sept. 7, 1937.  F. R. WEYMOUTH  2,092,662
RETRACTABLE LANDING GEAR
Filed Nov. 25, 1936  2 Sheets-Sheet 2

INVENTOR.
FREDERICK R. WEYMOUTH.
BY
ATTORNEY

Patented Sept. 7, 1937

2,092,662

UNITED STATES PATENT OFFICE 2,092,662

RETRACTABLE LANDING GEAR

Frederick R. Weymouth, Buffalo, N. Y., assignor to Curtiss-Wright Corporation, a corporation of New York Application November 25, 1936, Serial No. 112,639

9 Claims. (Cl. 244—102)

This invention relates to aircraft and is particularly concerned with improvements in retractable landing gears therefor.

In aircraft of modern design retractable landing gears are used to a large extent. As the design of such gears has progressed it has been found desirable to provide means for compressing the usual shock absorber strut when the landing gear is retracted, in order that the retracted gear will take up a minimum amount of space within the fuselage or wing in which the gear is stowed. Shock absorber struts in landing gears frequently are of the type utilizing compressed air as a resilient cushioning medium for the assumption of landing and taxiing shocks. The compressed air contained within the strut will ordinarily tend to keep the strut fully extended. It is apparent that, if the strut is to be compressed upon landing gear retraction, additional power would be required to further compress the air contained within the strut, increasing the effort necessary to effect retraction of the landing gear as a whole. This is undesirable and provision has been made in a copending application No. 674,812 to relieve air pressure within strut as landing gear retraction is initiated. In the said application, the strut is opened to atmospheric pressure so that, when the landing gear is again extended, the strut will contain air only under atmospheric pressure when the strut is in the extended but unloaded condition. Likewise, in such a strut, gravity must be depended upon for full extension of the pneumatic strut.

In the present invention, I propose to utilize at all times, air under positive pressure within the pneumatic strut, and I likewise propose to provide balanced pressure relieving means whereby the effort necessary to retract the landing gear will not be increased by virtue of said positive pressure in the strut.

Essentially, I provide a large fixed cylinder within the aircraft having a piston movable with the landing gear during extension and retraction, the piston varying the effective capacity of said cylinder, the capacity being at a maximum when the landing gear is retracted and at a minimum when the landing gear is extended. This cylinder is interconnected with the pneumatic shock absorber strut. Thus, when landing gear retraction is initiated, air passes from the strut to the cylinder which latter increases in volume and capacity as landing gear retraction progresses. When the landing gear is extended, the air within the fixed cylinder is placed under pressure by virtue of the moving piston therein, the compressed air being then passed to the pneumatic strut to aid in urging the latter toward an extended position.

Objects of the invention will be appreciated from the above brief description and comprise essentially the provision of means for relieving the pressure in pneumatic struts as used in aircraft landing gears. A further object is to provide an air pressure balancing organization as between a landing gear strut and a fixed air reservoir within the aircraft. A further object is to provide valve means responsive to landing gear operation for sealing air contained within the shock absorber strut when the landing gear is extended. Further objects will be noted in reading the annexed detailed description and in viewing the drawings in which:

Fig. 1 is a section through an aircraft fuselage and one side of a retractable landing gear.

Fig. 2 is an enlarged section through a portion of the landing gear.

Figure 4:
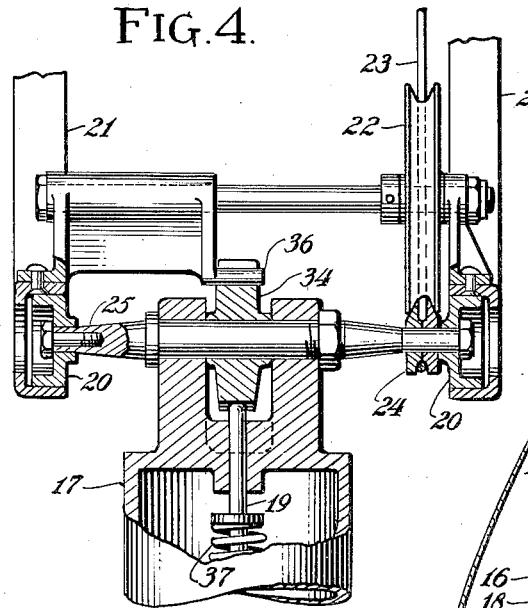
Figure 3:
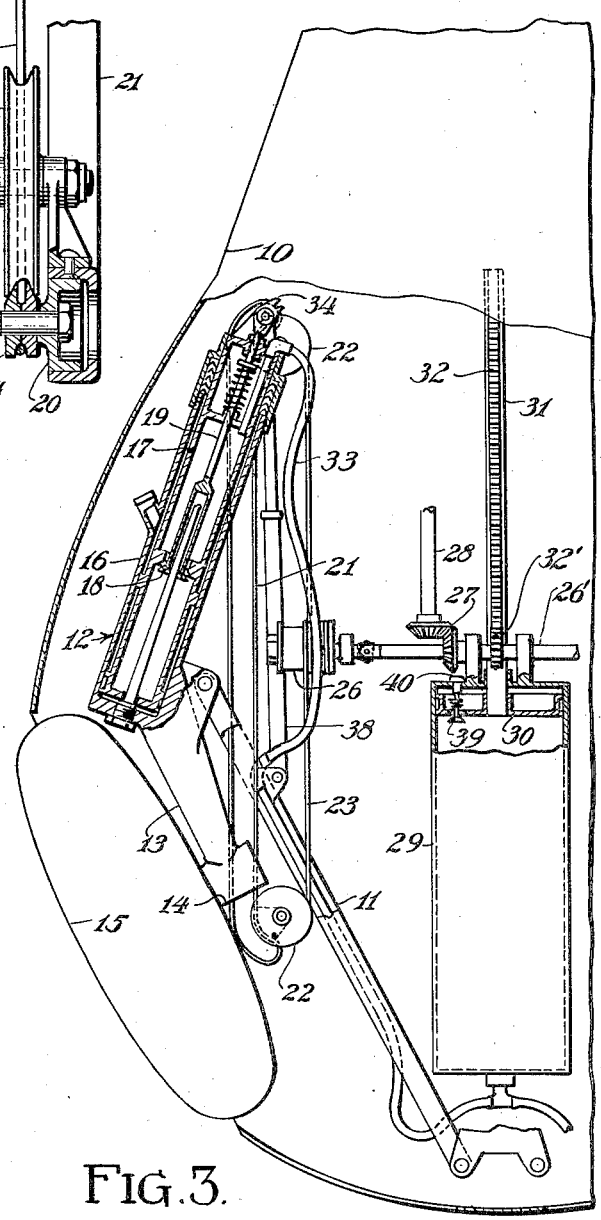
Fig. 3 is a section through the fuselage and landing gear with the latter in its retracted position and, Fig. 4 is a section on the line 4—4 of Fig. 1.

In the drawings I represent a fuselage 10 as having pivoted thereto a strut 11. At its lower end, the strut 11 is pivoted to the cylinder of a shock absorber strut 12. The lower end of said latter strut is extended at 13 to carry a stub axle 14 on which a wheel 15 is mounted. The shock absorber strut 12 comprises the cylinder designated as 16 embracing a plunger 17 slidable therewithin, the plunger having an air valve 18 organized, when closed, to seal air within the lower part of the plunger. The valve 18 is provided with a valve operating rod 19 extending through the top of the plunger.

The upper end of the plunger 17 is provided with rollers 20 engaging tracks 21 fixed in the aircraft. Pulleys 22 are provided at the ends of the track 21 over which a cable 23 passes, one part of the cable being fixed at 24 to the spindle 25 which carries the rollers 20. The cable passes around a drum 26 which is turnable by an operating shaft 28 acting through gearing 27. By turning the operating shaft in the appropriate direction, the cable 23 is traversed to effect translation of the rollers 20 along the track 21, and consequently extension or retraction of the landing gear.

Within the aircraft body I provide a cylinder 29 within which is a movable piston 30, the piston being moved up and down within the cylinder by means of a piston rod 31 having an integral rack 32 engaged with a pinion 32' carried on the same shaft 26' which carries the drum 26. The lower end of the cylinder 29 is connected by a flexible conduit 33 to the top of the plunger 17. It should be noted that the ultimate capacity of the cylinder 29 is considerably greater than the capacity of the shock absorber strut and, as shown, is greater than the capacity of two shock absorber struts as used for the similar halves of a normal landing gear.

A cam 34 is pivoted on the shaft 25 at the top of the shock absorber strut and is provided with a notch 35 engageable with the valve rod 19 to hold the valve 18 open as soon as the landing gear has been moved from the fully extended position. This cam is operated by a pin 36 fixed to part of the aircraft structure. As the landing gear is extended, the cam 34 engages the pin 36 swinging the notch 35 from the valve rod 19, permitting the valve to close under the influence of a spring 37. When landing gear retraction is initiated, the pin 36 again engages the cam 34, causing the notch 35 to reengage the valve rod 19, opening the valve 18.

The operation of the apparatus as a whole is as follows:

Assuming the landing gear to be in its fully extended position, as shown in Fig. 1, air will be contained within the shock absorber strut 16 under pressure, the valve 18 will be closed and the piston 30 in the cylinder 29 will be at the bottom of its stroke, whereby the cylinder has a minimum effective capacity. When landing gear retraction is initiated by operation of the member 28, the upper end of the plunger 17 is moved up the track 21 and simultaneously, the valve 18 is opened by the cam 34 as described. This places the interior of the shock absorber strut in communication with the cylinder. As retraction progresses, the piston 30 is raised within the cylinder 29 and the compressed air within the shock absorber strut passes thereto through the conduit 33. An auxiliary strut 38 connecting the strut 11 with the pivot 25 collapses the strut 12 as the landing gear is retracted, pushing air contained in the strut into the cylinder 29 whose effective capacity is constantly increasing. When the fully retracted position is reached nearly all of the air within the strut 12 has passed to the cylinder 29.

In subsequently extending the landing gear, the piston 30 in the cylinder 29 drives air through the conduit 33 into the strut 12 tending to positively extend the strut as the landing gear itself becomes fully extended. When the landing gear becomes fully extended the valve 18 will close to hold air contained within the working part of the strut 12 from leakage.

The capacity of the cylinder 29 may be such that when the landing gear is fully retracted the pressure within the cylinder may be atmospheric, although the pressure in the strut when the landing gear is extended is substantially greater than atmospheric. I prefer to incorporate a valve 39, in the piston 30, which is normally closed but which is opened when the landing gear is fully retracted by contact of the valve stem with a plug 40 in the head of the cylinder 29. This establishes a datum atmospheric pressure in the cylinder 29 every time the landing gear is retracted. It will be noted that there will always be a pressure balance between the shock absorber strut and the cylinder 29 during extension and retraction of the landing gear, so that no added effort is required to retract the landing gear in spite of the fact that positive air pressure exists within the shock absorber strut. During retraction, pressure in the cylinder 29 acts to aid retraction, counteracting the resistance to retraction caused by compressed air in the strut 12. During extension of the landing gear, the strut pressure tends to accelerate extension, this tendency being balanced by the pressure in the cylinder 29.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In an aircraft retractable landing gear including a pneumatic shock absorber strut and means for retracting and extending the landing gear, an air reservoir in the aircraft, piston means operated by said retracting and extending means for increasing and decreasing the effective volume of said reservoir upon landing gear retraction and extension respectively, and a conduit connecting said reservoir with the air containing part of said pneumatic strut.

2. In an aircraft retractable landing gear including a pneumatic shock absorber strut and means for retracting and extending the landing gear, an air reservoir in the aircraft, piston means operated by said retracting and extending means for increasing and decreasing the effective volume of said reservoir upon landing gear retraction and extension respectively, a conduit connecting said reservoir with the air containing part of said pneumatic strut and valve means responsive in its operation to final extensive movement of the landing gear for closing off said conduit.

3. In an aircraft retractable landing gear, an air reservoir in the aircraft having means operating in response to landing gear retraction and extension for respectively increasing and decreasing the effective volume of the reservoir, a shock absorber strut including a pneumatic cushioning cylinder, and a conduit connecting said cylinder with said reservoir.

4. In an aircraft retractable landing gear, a shock absorber strut including a pneumatic cushioning element, means for collapsing said strut upon landing gear retraction, an air reservoir connected with said element, and means associated with said reservoir for building up positive air pressure in said reservoir and element upon landing gear extension, and for reducing the air pressure in said element and reservoir upon landing gear retraction.

5. In an aircraft retractable landing gear, a shock absorber strut including a pneumatic cushioning cylinder, mechanical means responsive in its action to landing gear retraction for collapsing said strut, and means also responsive to landing gear retraction for reducing the gas pressure in said cylinder, said last named means being responsive to landing gear extension for building up positive gas pressure within said pneumatic cylinder.

6. In an aircraft landing gear, a bodily movable pneumatic shock absorber strut having a space adapted to contain air under pressure, said landing gear being organized to collapse said strut upon retraction whereby ordinarily the air pressure would increase, a cylinder in the aircraft, a piston in the cylinder connected with the landing gear for movement therewith upon extension and retraction thereof, said piston being organized to provide within said cylinder a small air containing space when the landing gear is extended and a large air containing space when the landing gear is retracted and a flexible air conduit extending between said cylinder and said pneumatic strut for the free interchange of air between said cylinder and strut during landing gear extensive and retractive movement, whereby the air pressure in said strut is relieved when the strut is retracted.

7. In an aircraft landing gear, a bodily movable pneumatic shock absorber strut having a space adapted to contain air under pressure, said landing gear being organized to collapse said strut upon retraction whereby ordinarily the air pressure would increase, a cylinder in the aircraft, a piston in the cylinder connected with the landing gear for movement therewith upon extension and retraction thereof, said piston being organized to provide within said cylinder a small air containing space when the landing gear is extended and a large air containing space when the landing gear is retracted, a flexible air conduit extending between said cylinder and said pneumatic strut for the free interchange of air between said cylinder and strut during landing gear extensive and retractive movement, whereby the air pressure in said strut is relieved, and means for opening said cylinder to the atmosphere upon complete landing gear retraction.

8. In an aircraft retractable landing gear, in combination, a pneumatic collapsible shock absorber strut adapted to contain gas under pressure, means for collapsing said strut responsive in its operation to landing gear retraction, and means for relieving the gas pressure within said strut responsive to landing gear retraction and for rebuilding the gas pressure in said strut upon landing gear extension.

9. In an aircraft retractable landing gear, in combination, a pneumatic collapsible shock absorber strut adapted to contain gas under pressure, means operated in response to landing gear retraction for collapsing said strut, means for relieving gas pressure responsive in its operation to landing gear retraction, and means for re-establishing said gas pressure responsive in its operation to landing gear extension.

FREDERICK R. WEYMOUTH.